Figure 1:
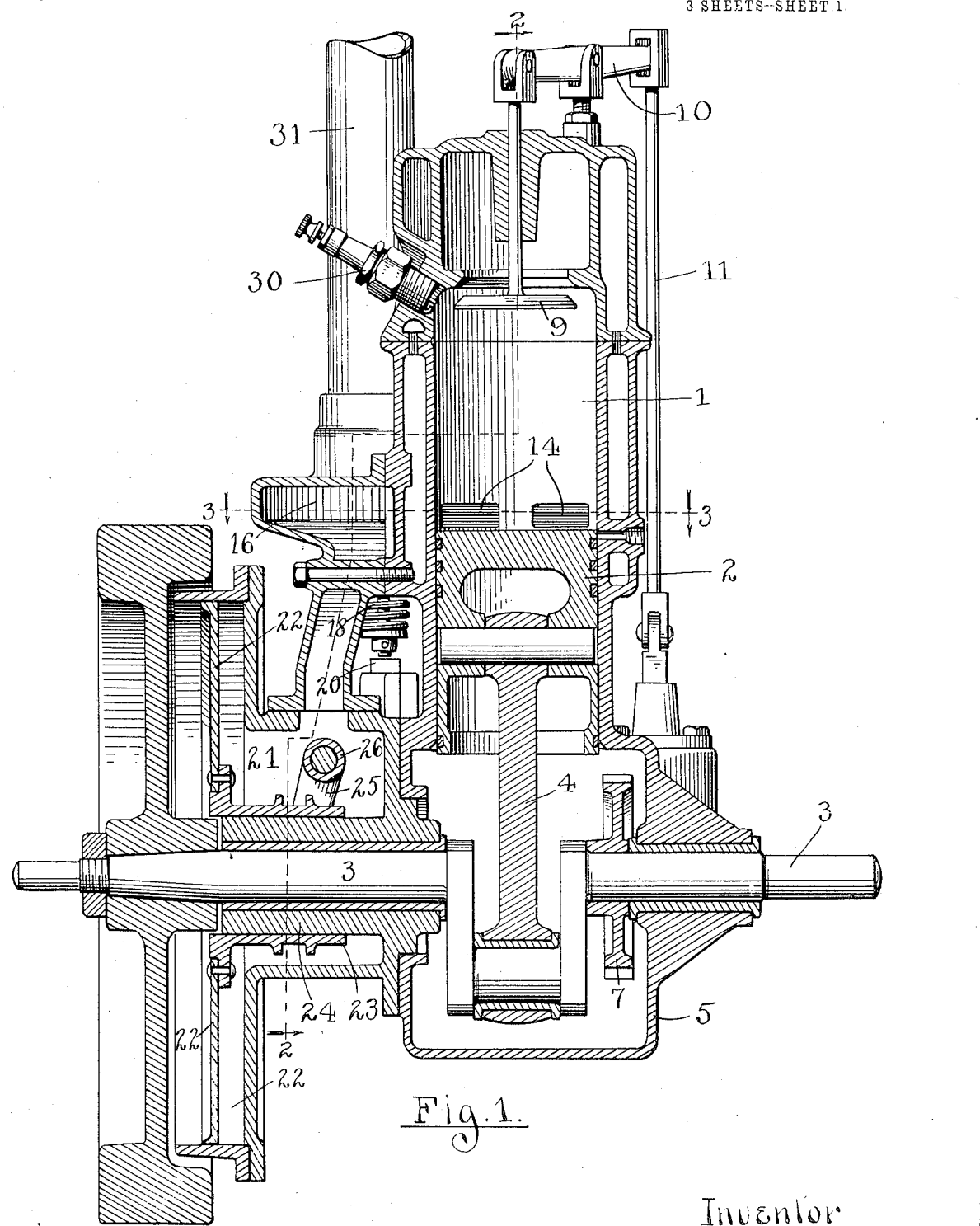

O. H. L. WERNICKE.
INTERNAL COMBUSTION ENGINE.
APPLICATION FILED FEB. 13, 1913. RENEWED SEPT. 11, 1914.

1,133,771.

Patented Mar. 30, 1915.
3 SHEETS—SHEET 3.

Witnesses
Harold O. Van Antwerp
Mae Rankin

Inventor
Otto H. L. Wernicke
By Luther V. Moulton
Attorney

UNITED STATES PATENT OFFICE.

OTTO H. L. WERNICKE, OF GRAND RAPIDS, MICHIGAN.

INTERNAL-COMBUSTION ENGINE.

1,133,771.          Specification of Letters Patent.      Patented Mar. 30, 1915.

Application filed February 13, 1913, Serial No. 748,099. Renewed September 11, 1914. Serial No. 861,326.

*To all whom it may concern:*

Be it known that I, OTTO H. L. WERNICKE, a citizen of the United States of America, residing at Grand Rapids, in the county of Kent and State of Michigan, have invented certain new and useful Improvements in Internal-Combustion Engines; and I do hereby declare the following to be a full, clear, and exact description of the invention, such as will enable others skilled in the art to which it appertains to make and use the same.

My invention relates to improvements in internal combustion engines and more particularly to that type commonly known as the two-stroke cycle engine, wherein the complete cycle of operations is completed during two strokes of the piston, and during one revolution of the crank shaft, and its object is to provide an engine of this type with simple and effective means for scavenging the cylinder at the end of the working stroke of the piston, and to induce a charge of fresh gas therein; and to provide the device with various new and useful features as hereinafter more fully described and particularly pointed out in the claims.

Heretofore, the chief objection to the two stroke cycle type of internal combustion engine, has been the inability to thoroughly scavenge the cylinder of burned gas at the completion of the working stroke with the result that the incoming charge of fresh gas was so diluted and contaminated by mixture with the residue from the previous explosion, part of which remained in the cylinder, as to prevent obtaining the greatest explosive force from the mixture. Furthermore, this condition necessitated an extravagant injection of fuel in order to obtain a mixture that would explode at all. All previous attempts to obviate this difficulty have resulted in overloading the engine with a large amount of delicate and intricate mechanism which did not prove to be efficient or practical.

My invention is intended to overcome these objections by simple, substantial and practical means which consists in combining with an ordinary form of two-stroke cycle engine having an inlet valve in its cylinder head and exhaust ports in the cylinder wall covered by the piston, except when at the bottom of its stroke, at which point, they are open to permit the escape of the exhaust therethrough, of an exhaust chamber communicating with the exhaust ports and having a mechanically operated exhaust valve therein through which the exhaust escapes. A suction chamber also communicates with the exhaust chamber and preferably surrounds the crank shaft to facilitate construction and a reciprocatory disk is located in the suction chamber and is actuated by a cam movement to produce a partial vacuum in the said chamber when the exhaust ports are uncovered in order to thoroughly remove the burned gas from the cylinder and to draw in a fresh charge, and after the exhaust ports are again covered by the rising of the piston, this disk returns, expelling the burned gas from the suction chamber through the exhaust valve which mechanically opens at the proper time.

Figure 2:
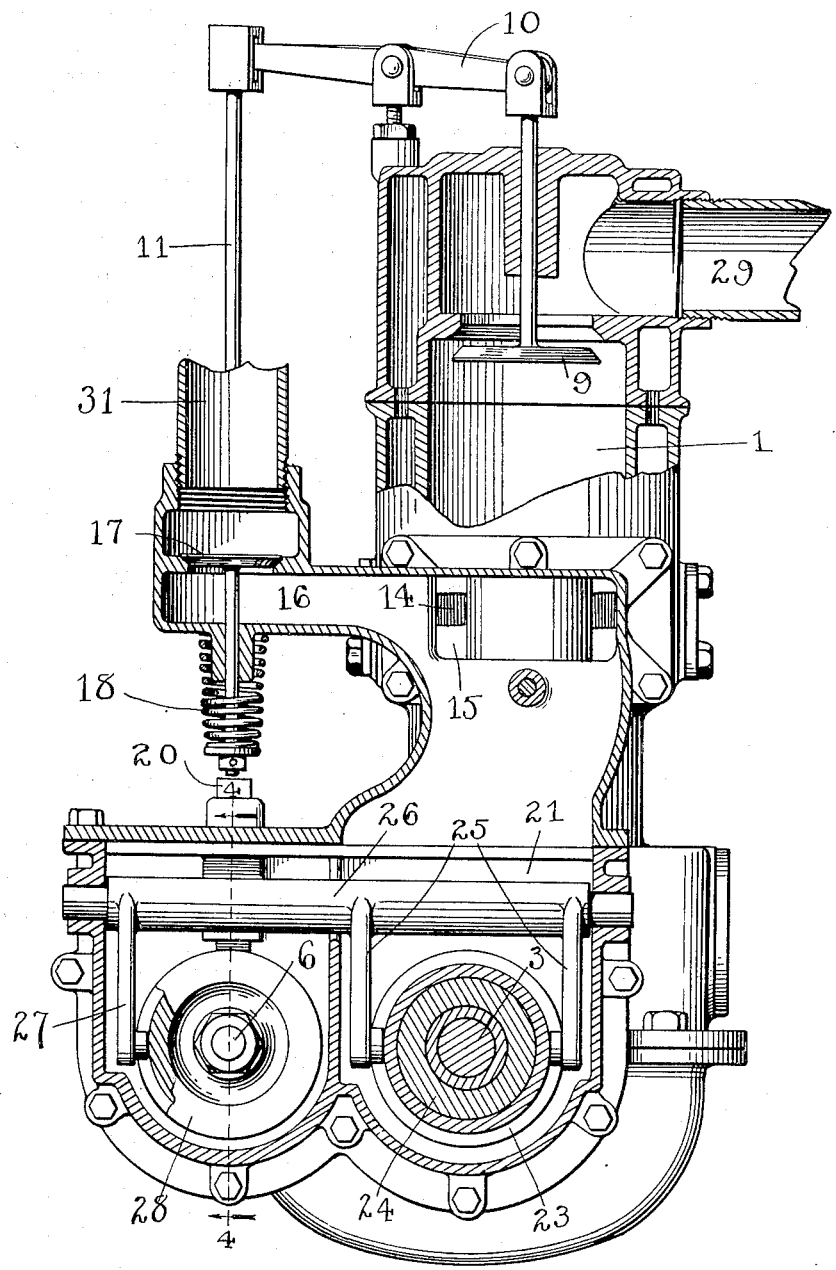
Figure 3:
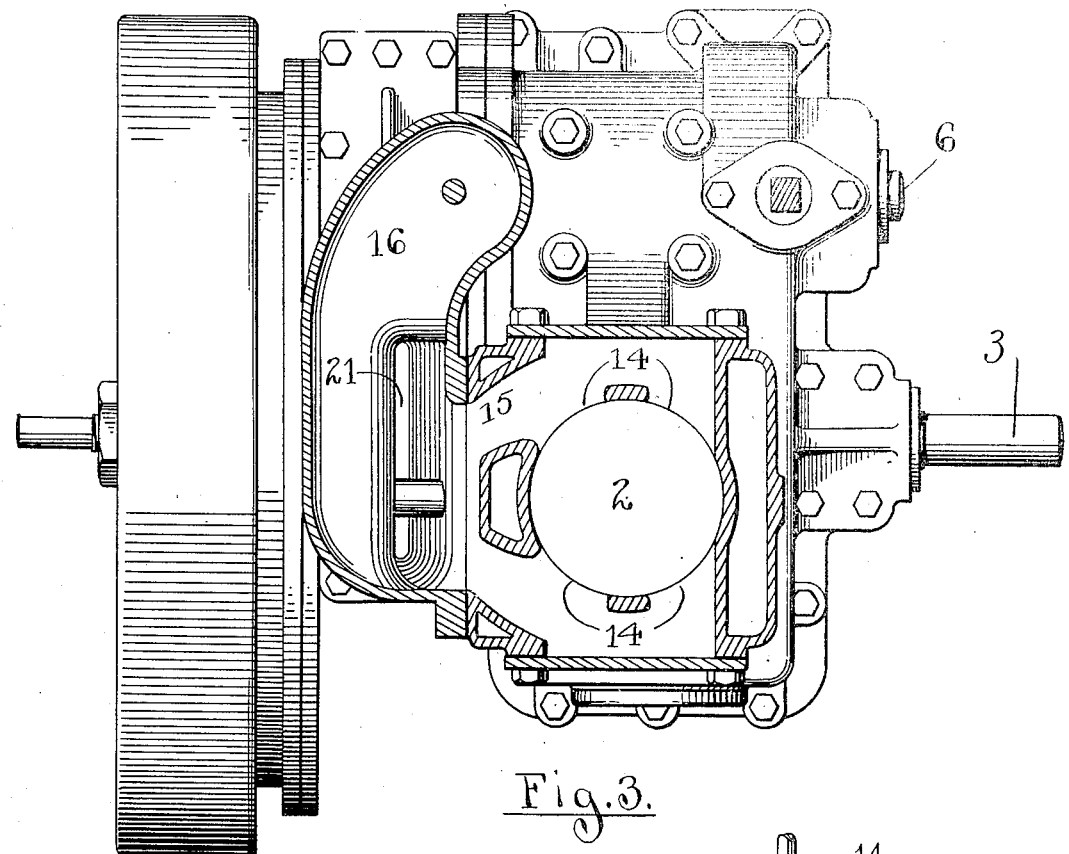
Figure 4:
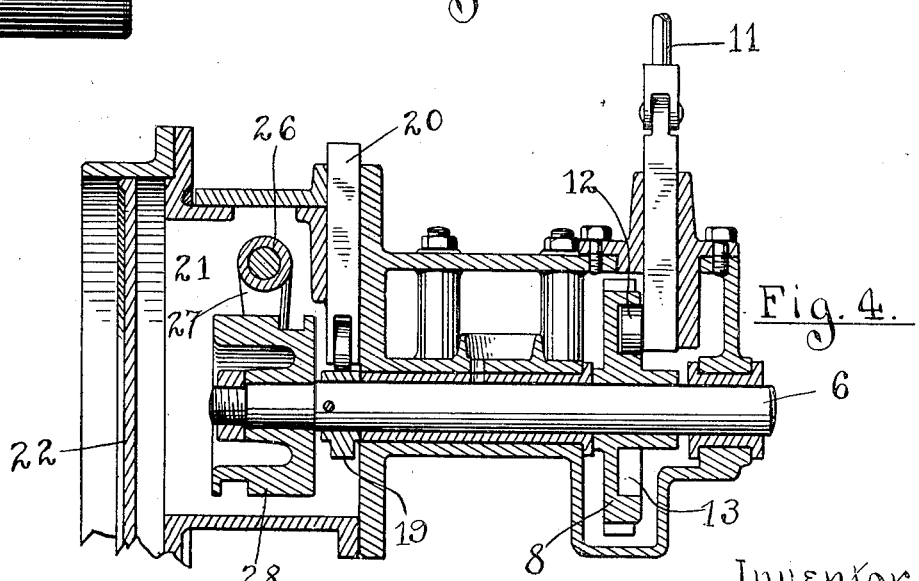

The device is also provided with various other novel features of construction and arrangement as will more fully appear by reference to the accompanying drawings in which;

Figure 1 is a sectional elevation of a device embodying my invention; Fig. 2 is a transverse sectional elevation of the same on a line 2—2 of Fig. 1. Fig. 3 is a sectional plan on a line 3—3 of Fig. 1; Fig. 4 is a vertical section through the axis of the cam shaft on the line 4—4 of Fig. 2.

Like numbers refer to like parts in all of the figures.

1 represents a cylinder having an ordinary reciprocatory piston 2 therein, which is connected to the crank shaft 3 in the ordinary way by a connecting rod 4, said crank shaft being journaled in the base 5 of the engine. A cam shaft 6 is also journaled in the base of the engine and extends parallel with the crank shaft and is spaced a short distance away from the same and is driven from the said crank shaft by gears 7 and 8, which are so proportioned that the cam shaft will rotate at the same speed of the crank shaft.

An inlet valve 9 is provided in the head of the cylinder and is mechanically operated through a rocker arm 10 and push rod 11 by a cam roller 12, which traverses a cam slot 13 preferably formed in the body of the gear on the cam shaft. The cylinder is also provided with exhaust ports 14, which extend through the cylinder wall near its central portion and are so arranged that they will be covered by the piston except when the piston is at the lower extremity of its stroke at which time, the ports will be opened to permit the escape of the burned gas. These exhaust ports 14 open directly into an annular chamber 15, which surrounds the cylinder at this point and this chamber communicates with an exhaust chamber 16 which is located at one side of the cylinder, and which is provided with an exhaust valve 17 which is mechanically opened at the proper time to permit the escape of the burned gas. The exhaust valve 17 is normally closed by a spring 18, which surrounds its downwardly extending stem and is opened by a cam 19 fixed to the cam shaft and engaging a push rod 20. The exhaust chamber 16 also communicates with a suction chamber 21, which preferably surrounds the crank shaft and in which is located a reciprocatory disk 22. This disk is mounted on a sleeve 23, which surrounds the bearing 24 of the crank shaft and is longitudinally slidable thereon. The sleeve and disk are actuated by yoke arms 25 which project downwardly from the rock shaft 26 and embrace the sleeve, being provided at their lower ends with studs which extend into an annular groove in the sleeve. The rock shaft 26 extends transversely above the crank shaft and cam shaft and is provided with a downwardly extending arm 27 having a cam roller at its lower end, which is arranged to enter and traverse a cam groove in a drum 28 on the cam shaft. It will be noted that as the disk is moved outwardly, it will create a partial vacuum in the suction chamber 21, which will aid in discharging the burned gas from the cylinder through the ports 14. The movement of this disk being so timed that its outward stroke will occur when these ports are uncovered. As the piston returns and the ports 14 are again covered, the disk moves backward and discharges the contents of the chamber through the exhaust chamber and exhaust valve 17, which has been mechanically opened for this purpose.

The operation of the device is as follows:—Assuming the piston to be at the top of the cylinder with a charge of combustible gas compressed therein, this gas is ignited by any convenient device, a spark plug 30 being shown for that purpose. As the piston nears the bottom of its working stroke the exhaust valve 17 having been previously opened by means of the cam 19 and push rod 20, is held open until the exhaust ports 14 have been partially uncovered. This permits the first strong impulse of the escaping gas from these ports to discharge through the exhaust valve and escape. The exhaust valve then closes and the reciprocatory disk 22 in the suction chamber begins its outward stroke, which continues as the piston moves downward, and also during a portion of the return stroke until the exhaust ports are again closed, and thoroughly scavenges the cylinder of all burned gas contained therein, and at the same time draws in a charge of fresh combustible gas through the inlet valve 9 which opens at the time the exhaust valve 17 closes. This combustible charge is drawn in through an inlet pipe 29 and is supplied by any convenient device; the ordinary carbureter being adaptable for this purpose. As the piston on its up stroke again closes the exhaust ports 14, the inlet valve 9 mechanically closes and entraps the explosive mixture in the cylinder which is compressed as the piston rises to the top of its stroke, at which time ignition again occurs and the operation is repeated. After the exhaust ports 14 have been closed by the piston and communication between the exhaust chamber and the cylinder thus cut off, the disk 22 begins its return stroke and at the same time the exhaust valve 17 is again raised and the burned gases contained in the suction chamber 21 and exhaust chamber 16, are forced out and escape through the exhaust pipe 31. There being no communication between the cylinder and exhaust chamber and passages during the working stroke of the engine, it is immaterial whether the exhaust valve be open or closed, hence, the valve is held open till the time exhaust ports 14 are first uncovered to allow the first impulse of the exploded mixture to escape therethrough as before described.

It will be noted that there is no communication between the crank case proper and the suction chamber 21, so that the movement of the piston has no effect upon the operation of the reciprocatory disk 22 in performing its function. It will also be noted, that this engine differs from the ordinary two cycle type, in that the induction of a fresh charge does not depend upon compression in the crank case, but is drawn in by the suction caused by the disk 22 as the burned gas is drawn out of the cylinder.

This invention is herein shown and described as applied to a single cylinder engine, but it is obvious that it may be applied to, or incorporated in an engine of more than one cylinder and that the same reciprocatory disk 22 may be made capable of operating for several cylinders; its function being completed during a small part of the revolution of the crank shaft.

What I claim is:—

1. An internal combustion engine, comprising a cylinder having an exhaust port, means for periodically opening said port, an exhaust valve and an exhaust chamber communicating with said port, means for opening the exhaust valve during the early part of the time that the exhaust port is open, means for drawing the burned gases from the cylinder into the exhaust chamber during the remainder of the time that the exhaust port is open, and for discharging the contents of the exhaust chamber after the exhaust port is closed.

2. An internal combustion engine, comprising a cylinder having an exhaust port opened periodically by movement of the piston, a chamber communicating with said port, a normally closed exhaust valve communicating with said chamber, a reciprocating member in the chamber to exhaust burned gases from the cylinder, and means for opening the exhaust valve during the early part of the time that the exhaust port is open, and again opening said valve after the exhaust port is closed.

3. An internal combustion engine, comprising a cylinder having an exhaust port, a piston reciprocable in said cylinder and periodically opening said port, a chamber communicating with said port, a normally closed exhaust valve communicating with said chamber, a reciprocable member in said chamber to draw burned gases from the cylinder during the latter part of the time that the exhaust port is open and to discharge the same through the exhaust valve after the exhaust port is closed, means for opening the exhaust valve during the early part of the time that the exhaust port is open, said means also allowing the valve to close during the remainder of said time and while the reciprocating member is drawing the gases from the cylinder, and reopening the valve after the port is closed by the piston.

4. An internal combustion engine of the two cycle type, comprising an inlet valve in the cylinder, an exhaust port in the cylinder wall covered by the piston and uncovered by the same, an exhaust chamber communicating with the exhaust port, a valve leading from the exhaust chamber, a suction chamber communicating with the exhaust chamber and said exhaust valve, a reciprocatory disk in the suction chamber, means for holding the exhaust valve open until the exhaust port is partially uncovered, means for moving the reciprocatory disk outward after the exhaust valve has closed and until the exhaust port is again closed, and for moving the disk inward after the exhaust port has been closed, and means for again opening the exhaust valve while the reciprocatory disk is moving inward.

5. An internal combustion engine comprising an inlet valve in the cylinder, an exhaust port in the cylinder wall opened and closed by the movement of the piston, an exhaust chamber an exhaust valve leading directly from the exhaust chamber, means for actuating the said exhaust valve, a suction chamber surrounding the crank shaft bearing and communicating with the exhaust chamber, a reciprocatory disk in the suction chamber, and means for moving the disk outward while the exhaust port is uncovered to remove the burned gases from the cylinder and for moving the same inward after the exhaust port has been closed to expel the contents of said chamber.

6. An internal combustion engine comprising an inlet valve in the cylinder, an exhaust port in the cylinder wall opened and closed by the movement of the piston, an exhaust chamber communicating with the said exhaust port, an exhaust valve leading from the said chamber, a suction chamber surrounding the crank shaft bearing a disk in said chamber surrounding said bearing and slidable thereon, a shaft journaled in the frame of the engine and rotating at the crank shaft speed, a cam on this shaft engaging a push rod to actuate the said exhaust valve, a drum mounted on said shaft and provided with a cam groove in its periphery, a rock shaft provided with an arm having a roller to traverse the cam groove, and a yoke on the shaft to embrace the hub of the reciprocatory disk to operate the same.

7. An internal combustion engine comprising a cylinder having an exhaust port opened periodically by movement of the piston, an exhaust chamber communicating with said port, an exhaust valve for said chamber, another chamber, a reciprocal disk in the latter chamber, and means to open the exhaust valve during the early part of the time that the exhaust port is open, means for reciprocating said disk to create a suction in the last-named chamber to draw the burned gases in the cylinder into the exhaust chamber during the remainder of the time that the exhaust port is open and also to draw a fresh charge into the cylinder, said disk effecting a discharge of the contents of the exhaust chamber after the exhaust port is closed.

In testimony whereof I affix my signature in presence of two witnesses.

OTTO H. L. WERNICKE.

Witnesses:
 HAROLD O. VAN ANTWERP,
 MAE RANKIN.